Jan. 3, 1950     J. B. CASEY     2,493,389
BATTERY CABLE TERMINAL
Filed Oct. 21, 1947
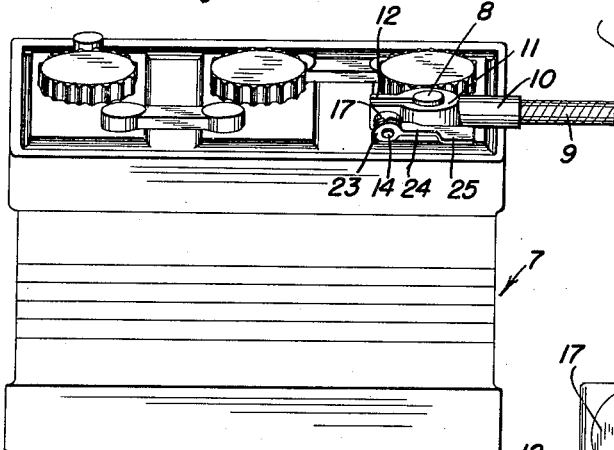
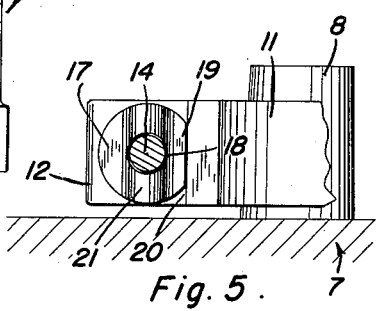
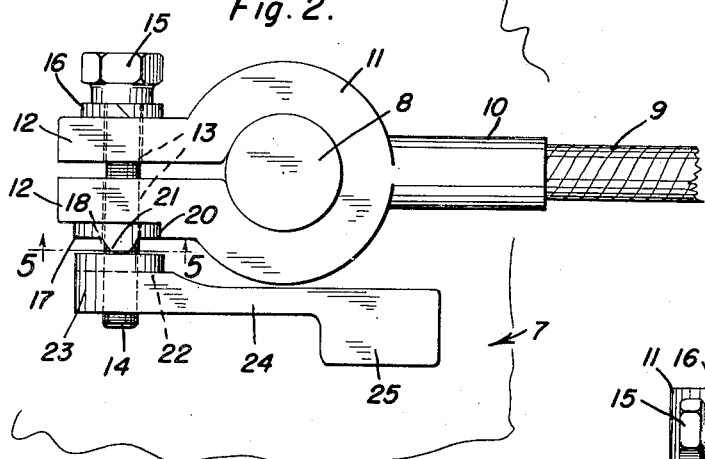
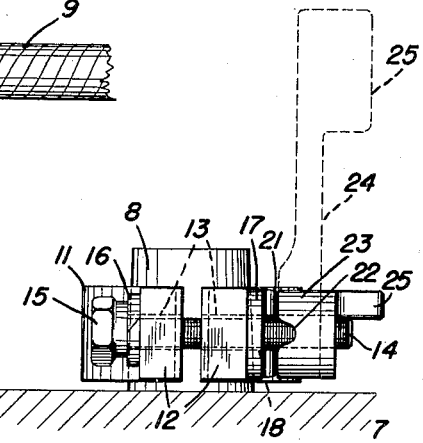
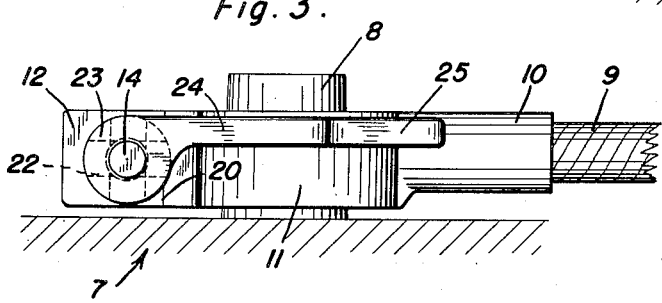
John B. Casey
INVENTOR.

Patented Jan. 3, 1950

2,493,389

UNITED STATES PATENT OFFICE 2,493,389

BATTERY CABLE TERMINAL

John B. Casey, Milwaukee, Wis.

Application October 21, 1947, Serial No. 781,083

1 Claim. (Cl. 173—259)

The present invention relates to cable terminals such as are employed in making electrical connections between current-conducting cables and current-supply posts on conventional-type storage batteries.

A common type of cable terminal comprises a split collar or ring, the free end portions which are adjacent the slit being provided with outstanding lugs, and said lugs serving to accommodate bolt and nut means, whereby they, in conjunction with the ring, may be frictionally bound and clamped securely around the battery post. Due to corrosion and other attending difficulties, separation of the terminal from the post, when desired, is hampered and attended by objectionable difficulties.

The faults commonly met in this line of endeavor have resulted in inventions of many types seeking to meet and overcome such inconveniences. It is the purpose of the present invention to cope with the recognized problem through the medium of what is believed to be an improved and more satisfactory cable-attaching terminal, the same being desirable in that it is simple, practical and such in construction that the aforementioned split collar may be retained but may be applied and removed with appreciable speed and expediency.

Other objects and advantages of the invention will become more readily apparent from the following description and the accompanying illustrative drawings.

In the drawings, wherein like numerals are employed to designate like parts throughout the views:

Figure 1 is a perspective view of an ordinary or conventional-type storage battery showing a cable, a cable terminal and improvements therein perfected in accordance with the specific principles of the present invention;

Figure 2 is a top plan view of the terminal means, the same on a scale enlarged, compared to that shown in Figure 1;

Figure 3 is a side elevational view, with parts in section, of the structure seen in Figure 2;

Figure 4 is an end view of the structure of Figures 2 and 3, observing same in a direction from left to right;

Figure 5 is a cross sectional view, fragmentary in type and on an enlarged scale, said view taken on the plane of the line 5—5 of Figure 2, looking in the direction of the arrows; and Figure 6 is a perspective view of a fragmentary type showing the essential parts which go to represent the improvements herein under advisement.

Referring now to the drawings by distinguishing reference numerals, the storage battery, which is of a regulation type, is denoted by the numeral 7 and is of the construction shown in Figure 1, the same having customary current take-off posts 8. I have shown a single current-conducting cable 9 and this is attached by a socket or sleeve 10 to the usual type of terminal or clamp. The latter is here shown as of the ring or split collar type 11 which substantially embraces the post and whose split ends have outstanding lugs or prongs 12 which are possessed of inherent resiliency which tend to spring same normally apart. These prongs are provided with smooth walled openings or bolt holes 13 to accommodate the shank of the bolt, the shank 14. The latter is screw-threaded and is passed through said bolt holes in a more or less well known manner. The head 15 of the bolt has flat faced portions to accommodate a wrench or equivalent tool. The numeral 16 designates a spring washer which is interposed between the bolt head and the adjacent lug or prong 12.

In carrying out the improvements, the shank of the bolt is longer than usual in order to handle a special clamping arrangement. The latter comprises a special washer 17 having a smooth hole 18 for the bolt and provided on its marginal portion with a flat surface 19 constituting an abutment. This abutment is adapted to contact a shoulder 20 which constitutes a part of a notch formed in one of the lugs 12, the one seen, for example, in Figure 5. The flat surface 19 bearing against the shoulder prevents rotation of said washer. The washer is also provided with a convexed rib 21 which serves to define cam elements. These cam elements fit into a clearance groove provided therefor, the groove 22, the latter being formed in a tension take-up and clamping nut 23. The latter is provided with a lever 24 and a finger grip 25. When the lever is swung down to place the nut in the position seen in Figure 2, the necessary take-up and clamping result is attained. At this time, the cam elements bridge the clearance groove 22 and the "cam action" attains the clamping requirements needed. When the lever is swung up to the dotted line position shown in Figure 4, and the cam element and groove then brought into registry with each other, it is obvious that the clamping grip of the collar on the post is released sufficiently to permit the terminal and cable to be separated from the post. Incidentally, the spring lock washer 16 keeps the prongs 12 constantly under tension, and this, in turn, keeps the nut 23 and cam elements 21 in contact with each other, yet permits the presence of sufficient "play" to allow the desired quick and ready separation of terminal from its post. It follows that the construction shown and described constitutes quick and effective ways and means of applying and removing a cable terminal.

In view of the foregoing description, taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

A battery cable terminal of the class described comprising a battery post embracing collar, said collar being split and the end portions of the collar being provided with outstanding expandable and contractable jaws, said jaws being disposed in opposed approximate parallelism and having aligned bolt holes, a bolt having a shank passing through said bolt holes, one of said jaws being provided, inwardly of the tip portion of the jaw and immediately adjacent said collar, with a flat surfaced stop shoulder, the latter being at right angles to the longitudinal reach of said one jaw, an independent washer surrounding one end portion of the shank of the bolt, said washer having a flattened peripheral edge portion in firm engaging contact with said shoulder, said washer also being provided on an outwardly facing surface with cam means, and a nut threaded on the shank of the bolt and having a cam accommodating and reception groove, said nut also having an integral lever and said lever being provided with a handle.

JOHN B. CASEY.

REFERENCES CITED

The following references are of record in the file of this patent:

UNITED STATES PATENTS

| Number | Name | Date |
| --- | --- | --- |
| 40,948 | Rymes | Dec. 15, 1863 |
| 1,696,531 | Eaton | Dec. 25, 1928 |
| 1,724,753 | Doherty | Aug. 13, 1929 |
| 1,868,939 | Conrad | July 26, 1932 |
| 2,156,013 | Graves et al. | Apr. 25, 1939 |
| 2,347,168 | Beckman | Apr. 25, 1944 |

FOREIGN PATENTS

| Number | Country | Date |
| --- | --- | --- |
| 92,919 | Sweden | Oct. 11, 1938 |